(12) United States Patent
Brinner et al.

(10) Patent No.: US 7,846,606 B2
(45) Date of Patent: Dec. 7, 2010

(54) BIPOLAR PLATE, A METHOD FOR THE PRODUCTION OF A BIPOLAR PLATE AND A FUEL CELL BLOCK ARRANGEMENT

(75) Inventors: Andreas Brinner, Rutesheim (DE); Tilo Maag, Pfinztal (DE)

(73) Assignee: Deutsches Zentrum fuer Luft-und Raumfahrt e. V., Koeln (DE)

( * ) Notice: Subject to any disclaimer, the term of this patent is extended or adjusted under 35 U.S.C. 154(b) by 41 days.

(21) Appl. No.: 12/004,506

(22) Filed: Dec. 19, 2007

(65) Prior Publication Data
US 2008/0166614 A1 Jul. 10, 2008

Related U.S. Application Data

(63) Continuation of application No. PCT/EP2006/004928, filed on May 24, 2006.

(30) Foreign Application Priority Data
Jun. 27, 2005 (DE) ................ 10 2005 031 081

(51) Int. Cl.
*H01M 8/02* (2006.01)
*B32B 37/12* (2006.01)
*H01M 4/82* (2006.01)

(52) U.S. Cl. .............. 429/452; 429/457; 429/469; 429/507; 429/511; 429/518

(58) Field of Classification Search ........... 429/34, 429/452, 457, 469, 507, 511, 518
See application file for complete search history.

(56) References Cited

U.S. PATENT DOCUMENTS

| | | | |
|---|---|---|---|
| 5,342,706 A | * | 8/1994 | Marianowski et al. ...... 429/35 |
| 6,261,710 B1 | * | 7/2001 | Marianowski ............. 429/34 |
| 2002/0081478 A1 | | 6/2002 | Busenbender |
| 2003/0165731 A1 | | 9/2003 | Vyas et al. |
| 2003/0180598 A1 | | 9/2003 | Fischer et al. |
| 2004/0081881 A1 | | 4/2004 | Vyas et al. |
| 2004/0115515 A1 | * | 6/2004 | Ueda et al. ............ 429/40 |

(Continued)

FOREIGN PATENT DOCUMENTS

DE 103 01 052 7/2004

(Continued)

*Primary Examiner*—Dah-Wei D Yuan
*Assistant Examiner*—Amanda Barrow
(74) *Attorney, Agent, or Firm*—Lipsitz & McAllister, LLC

(57) ABSTRACT

A bipolar plate for electro-chemical applications is proposed, comprising a first cover layer of a metallic material, a second cover layer of a metallic material, and a supporting layer of a metallic material which is arranged between the first cover layer and the second cover layer and is connected to the first cover layer and the second cover layer, wherein the supporting layer comprises at least one row of contact areas for the first cover layer and/or the second cover layer and free spaces are formed between neighboring contact areas, wherein at least one passage opening is provided for conveying fuel and/or oxidizer, and wherein an insert element by means of which point forces are introducible over an area is arranged between the first cover layer and the second cover layer in the region of the at least one passage opening.

40 Claims, 10 Drawing Sheets

U.S. PATENT DOCUMENTS

2005/0118488 A1* 6/2005 Sadamoto et al. .............. 429/38
2007/0207366 A1 9/2007 Sommer et al.

FOREIGN PATENT DOCUMENTS

| DE | 10 2004 050 921 | 5/2005 |
| DE | 10 2004 016 318 | 10/2005 |
| EP | 0 851 518 | 5/2001 |
| WO | 02/15311 | 2/2002 |

* cited by examiner

BIPOLAR PLATE, A METHOD FOR THE PRODUCTION OF A BIPOLAR PLATE AND A FUEL CELL BLOCK ARRANGEMENT

This application is a continuation of international application number PCT/EP2006/004928 filed on May 24, 2006.

The present disclosure relates to the subject matter disclosed in international application number PCT/EP2006/004928 of May 24, 2006 and German application number 10 2005 031 081.8 of Jun. 27, 2005, which are incorporated herein by reference in their entirety and for all purposes.

BACKGROUND OF THE INVENTION

The invention relates to a bipolar plate for electro-chemical applications, comprising a first cover layer of a metallic material, a second cover layer of a metallic material and a supporting layer of a metallic material which is arranged between the first cover layer and the second cover layer and is connected to the first cover layer and to the second cover layer, wherein the supporting layer comprises at least one row of contact areas for the first cover layer and/or the second cover layer and free spaces are formed between neighbouring contact areas.

Furthermore, the invention relates to a method for the production of a bipolar plate, wherein a first cover layer is produced from a metallic material, a supporting layer is produced from a metallic material with transverse webs and free spaces located between neighbouring transverse webs, a second cover layer is produced from a metallic material, and the first cover layer and the second cover layer are connected together by the supporting layer.

Furthermore, the invention relates to a fuel cell block arrangement including a fuel cell block.

Bipolar plates are inserted into a fuel cell block (a fuel cell pile or fuel cell stack) in order to enable fuel cells to be electrically connected in series with one another. The anode and the cathode of neighbouring fuel cells are connected together electrically by a bipolar plate.

From DE 697 05 016 T2 (EP 0 851 518 B1), there is known a liquid-cooled bipolar plate for the separation of neighbouring first and second cells of a PEM fuel cell which comprises a first corrosion resistant metal plate having one side exposed to hydrogen and a second corrosion resistant metal plate having a side exposed to oxygen. The metal plates comprise a plurality of webs which define a plurality of grooves and serve for the distribution of hydrogen and oxygen. The first metal plate and the second metal plate are separated from each other by a separating metal plate which is connected metallurgically to the first metal plate and the second metal plate by means of brazed connections. The metal separating plate can be perforated and corrugated.

From DE 103 01 052 A1, there is known a bipolar plate unit having two sub-plates for an electro-chemical cell, wherein at least one of the main surfaces of the sub-plates has a channel structure and wherein the sub-plates are arranged one above the other along their main surfaces in such a manner that an inner channel system is formed between the mutually facing main surfaces. In the boundary region of the sub-plates, means are provided for sealing the inner channel system with respect to the external environment, said means spacing the sub-plates.

From DE 10 2004 016 318 A1, there is known a bipolar plate for electro-chemical systems which contains a first plate having a first flow-field for the distribution of a medium as well as a second plate having a second flow-field for the distribution of a medium, wherein the first plate has a flat surface section at least in places in the region of the first flow-field from which protruding, discrete and mutually spaced elevated portions are distributed.

SUMMARY OF THE INVENTION

In accordance with the present invention, a bipolar plate of the type mentioned hereinabove is provided, which is producible in a simple manner and which exhibits advantageous properties.

In the case of the bipolar plate mentioned hereinabove, in accordance with the invention, at least one passage opening is provided for conveying fuel and/or oxidizer and an insert element by means of which point forces are introducible over an area is arranged between the first cover layer and the second cover layer in the region of the at least one passage opening.

In accordance with the invention, a bipolar plate is made available which is of good electrical conductivity and good thermal conductivity. Furthermore, long-term gas-tight properties with high mechanical stability are also provided. Since the bipolar plate can be produced as a sandwich structure having two or three layers of material, it can be produced economically and in large numbers.

The corresponding bipolar plate can be produced, in particular, by sheet metal working processes such as sheet metal stamping, sheet metal folding or a folding process. The connection between the cover layers and the supporting layer can be obtained in a simple manner by furnace brazing techniques in a continuous furnace for example.

Cheap base materials based on aluminium, magnesium or steel for example can be employed. The base materials may already be pre-coated, for example, with a solder layer and/or an anti-corrosive layer.

Due to the simple method of production, it is easy to adapt the arrangement to a particular application, for example, in regard to matching the medium (such as matching it to a coolant for example), adjustment of the size or adjustments to the number of items produced.

Good gas-tight properties with a high level of electrical conductivity and very good thermal conductivity can be achieved in a simple manner.

Due to the free spaces, coolant channels can be formed by means of which the bipolar plate and thus an electrode can be directly cooled. Consequently, there is an optimal facility for directly cooling the surfaces of electrodes, those of a fuel cell for example, directly at the point where the waste heat is being developed. Thereby in turn for example, the working current density of a fuel cell can be increased (by around a factor of 2 to 3 for example) in comparison with indirect cooling processes.

Due to the provision of free spaces, the weight of the bipolar plate is also reduced compared with a solid metal body.

At least one passage opening is provided for the conveyance of fuel and/or oxidizer. A passage opening can itself form a channel for the conveyance of a gas or a line for conveying the gas can be arranged in this passage opening.

An insert element is arranged between the first cover layer and the second cover layer in the region of the at least one passage opening. In particular, the supporting layer comprises a free space which, for example, is punched out so that the insert element can be accommodated therein. In particular, the height of the insert element substantially corresponds to the distance between the first cover layer and the second cover layer. Due to the insert element, point forces can be introduced over an area so that the mechanical stability of the arrangement is increased. Furthermore, good sealing of the passage opening relative to the interior of the bipolar plate can also be achieved by means of an insert element.

In particular, the free spaces extend between the first cover layer and the second cover layer and/or between a cover layer and a contact area of the supporting structure on the other cover layer. In consequence, a predominant proportion of the volume between the first cover layer and the second cover layer can be provided with free spaces. The weight of the bipolar plate can then be kept very low. Furthermore, effective removal of heat by the flow of a coolant through the bipolar plate can thereby be achieved.

In particular, the free spaces are aligned substantially in parallel with one another. The bipolar plate can thus be produced in a simple manner and effective cooling properties are ensured.

In particular, the free spaces extend between a first end face of the bipolar plate and an oppositely located second end face of the bipolar plate. Such a bipolar plate can be produced in a simple manner. Furthermore, a coolant can be passed through the bipolar plate in a simple manner.

In particular, the free spaces are open at the end faces. In consequence, a coolant can be passed through the bipolar plate in a simple manner in order to achieve direct cooling of the electrodes.

In particular, the free spaces each have a longitudinal axis which is substantially a straight-line. In consequence, the bipolar plate is "transparent" with respect to the free spaces, i.e. straight channels are formed which reach from one end face to the opposite end face. Such a bipolar plate can be produced in a simple manner and a coolant can be passed through in a simple manner.

In particular, the free spaces each have a longitudinal axis which is substantially parallel to the first cover layer and which is substantially parallel to the second cover layer. (The first cover layer and the second cover layer are usually aligned in parallel with one another.) The corresponding free spaces can thus be produced in a simple manner.

Furthermore, it is expedient if the free spaces each have a longitudinal axis which is transverse and in particular perpendicular to an end face of the bipolar plate. Simple fabrication is thereby ensured and a coolant can be passed through in a simple manner.

In particular, at least 70% of the spatial volume between the first cover layer and the second cover layer is occupied by free spaces, i.e. only a small proportion of the spatial volume is occupied by the material of the supporting layer.

Provision is made for neighbouring free spaces to be separated from each other in fluid-tight manner in order to enable effective cooling to be achieved.

In particular, the supporting layer comprises webs which are oriented transversely relative to the second cover layer and transversely relative to the first cover layer. The first cover layer and the second cover layer are held at a spacing from each other by these webs and are thereby connected by the supporting layer. Hereby, the webs may be perpendicular to the cover layers or at an angle thereto. The webs can be formed in a straight-line or could also be curved. For example, they can be curved in sinusoidal manner.

It is expedient if the free spaces each have substantially the same cross section. The bipolar plate can thus be produced in a simple manner. For example, a supporting layer can be bent or folded or a supporting layer can be produced by a rolling process.

For the same reason, it is expedient if the supporting layer has a periodic structure. This periodic structure can be produced in a simple manner by bending or folding or it can be produced in a simple manner by material rolling or a rolling process.

It is especially advantageous, if the free spaces are in the form of coolant channels. Direct cooling of the electrode surfaces by means of the bipolar plate can thereby be achieved in an effective manner.

It is expedient for the contact areas of the at least one row of contact areas to lie substantially in a plane. A connection between a cover layer and the supporting layer can thereby be achieved in a simple manner.

It is expedient for a connecting medium layer to be arranged between contact areas of the supporting layer and the first cover layer and/or the second cover layer. The supporting layer can be connected to the corresponding cover layer by this connecting medium layer.

The connection can be produced in a simple manner if the connecting medium layer is a solder layer or an adhesive layer consisting of an electrically conductive adhesive. The solder layer can be produced by brazing or soft soldering in a furnace for example. In particular, the starting material is pre-provided with a solder coating and the corresponding layers are connected together by heating in an oven during the production process.

Provision can be made for the first cover layer and/or the second cover layer to be formed in one piece. These are made from a thin metal sheet by sheet metal working processes for example.

It is also possible for the supporting layer to be formed in one piece. This is produced by folding or bending a metal sheet for example.

It is also possible for the supporting layer to be connected in one piece manner to either the first cover layer or the second cover layer. Such a combination of a cover layer and a supporting layer can be produced by rolling a metal sheet for example. Webs which form the supporting layer can be formed thereon.

The first supporting layer can be a folded structure or a wave-like structure which is produced by bending or folding a metal sheet for example.

In particular, the first cover layer and the second cover layer are formed such as to be gas-tight. In consequence, a gas distribution structure by means of which an electrode is adapted to be supplied with fuel or oxidizer can be arranged and/or formed thereon.

It is also expedient, if a protective coating is arranged on the first cover layer and/or on the second cover layer and/or on the supporting layer. This protective coating is, in particular, an anti-corrosive coating for preventing corrosion by the coolant for example.

It is expedient if at least one passage opening for a clamping element is provided. The fuel cells in a fuel cell block can be clamped together and held in a framework by means of clamping elements. Such a clamping element can be passed through a passage opening. Passage openings can be produced in a simple manner in a bipolar plate in accordance with the invention.

In particular, the insert element is a solid material element in order to obtain a high degree of mechanical stability.

It is expedient for the insert element to be connected to the first cover layer and the second cover layer by a solder layer for example.

Provision can be made for the supporting layer to be formed in the proximity of an insert element in such a way as to enable fluid flowing in the free spaces to flow past the insert element. This can be achieved for example, in that transverse webs in the region of the insert element are flattened.

If a passage opening serves as a fluid conveyance opening, then this is sealed, in particular, with respect to free spaces.

Furthermore, in accordance with the present invention, a method for the production of a bipolar plate of the type mentioned hereinabove is provided, which is adapted to be simple and economical to implement.

In accordance with the invention, at least one passage opening is produced in the bipolar plate and an insert element made of solid material is inserted in the region of the passage opening.

By virtue of the method in accordance with the invention, a bipolar plate can be produced in a simple manner since a cover layer with either an integrated supporting layer or a separate supporting layer and a further cover layer are producible from a metal sheet in a simple manner, for example, by sheet metal working processes such as stamping, folding etc.

In particular, "conventional" and thus low-priced metallic materials can be used.

Further advantages have already been described in connection with the bipolar plate in accordance with the invention; the bipolar plate in accordance with the invention can be produced by means of the method in accordance with the invention.

In particular, the second cover layer is connected to the supporting layer, whereby the connection can be effected by soldering or adhesion.

In one embodiment, the first cover layer is connected to the supporting layer by soldering or adhesion.

In an alternative embodiment, the first cover layer and the supporting layer are produced integrally, i.e. in particular, the first cover layer and the supporting layer are formed such as to be connected together in one piece manner.

In particular, this can be effected by rolling a metal sheet, whereby transverse webs which form the supporting layer are produced by the rolling process.

It is expedient if the first cover layer and/or the second cover layer are produced from a metal sheet.

For example, provision is made for a metal sheet provided with a protective coating to be used as the starting material for the first cover layer and/or the second cover layer and/or the supporting layer. In consequence, no additional outlay is then required for a subsequent coating.

It is expedient if at least one passage opening is produced in the bipolar plate. With the aid of such a passage opening, channels can be made available for the passage of a gas and/or clamping elements can be placed therein.

If an insert element made of solid material is inserted in the region of the passage opening, then the stability of the bipolar plate can be increased since, in particular, point forces can be introduced over a large surface area.

It is also possible for a gas distribution structure to be produced or be arranged on the bipolar plate.

For example, the gas distribution structure is made by the application of a sponge-like structure produced, for example, from a metallic sponge. This sponge is pressed flat. A gas diffusion layer can also be clamped thereby.

Furthermore, in accordance with the present invention, a fuel cell block arrangement which exhibits advantageous properties is provided.

In accordance with the invention, in the case of the fuel cell block arrangement mentioned hereinabove, a bipolar plate in accordance with the invention is provided between at least a first fuel cell and a second fuel cell.

The fuel cell block arrangement in accordance with the invention has the advantages that have already been described in connection with the bipolar plate in accordance with the invention.

In particular, the at least one bipolar plate is arranged in such a way that the coolant channels lie substantially horizontally. A simple arrangement for passing a coolant through the bipolar plate can thereby be obtained; in particular, cooling air can be passed through the bipolar plate in a simple manner. By virtue of such an arrangement for guiding the flow, heat can be dissipated directly from the electrode surfaces in an effective manner.

For example, a fuel cell is arranged and formed in such a way that fuel and oxidizer can flow through the fuel cell in a substantially vertical direction. An effective supply of fuel and an effective supply of oxidizer for the fuel cell can thereby be obtained.

If a coolant inlet into the coolant channels of the bipolar plate is located at that position where the hottest medium is expelled, then an effective cooling process can be obtained.

In particular, the outlet for the hottest medium is an air outlet for the oxidizing air (which is now oxygen-impoverished and water vapour-enriched).

It is especially advantageous, if an open end face of the at least one bipolar plate faces a radiator grille. A coolant in the form of cooling air can thereby be supplied to the bipolar plate in a simple manner in order to achieve, in turn, direct cooling of the electrode surfaces.

For the same reason, it is expedient if an open end face of the at least one bipolar plate faces a fan. In consequence, cooling air, which is sucked in by the fan, can flow through the bipolar plate and thus effective cooling of the electrodes can be achieved.

It is especially advantageous, if the at least one bipolar plate is arranged between a radiator grille and a fan so that cooling air which flows in through the radiator grille and is being drawn in by the fan can flow through the bipolar plate and can cater for the cooling process.

Effective cooling can be achieved, if a cover member for guiding the cooling air is arranged between the fuel cell block and the fan. By virtue of this cover member, it can be ensured that air sucked in by the fan is passed through the at least one bipolar plate. In turn, effective cooling can thereby be achieved.

The following description of preferred embodiments taken in conjunction with the drawings will serve for a more detailed explanation of the invention.

DETAILED DESCRIPTION OF THE INVENTION

Figure 1:
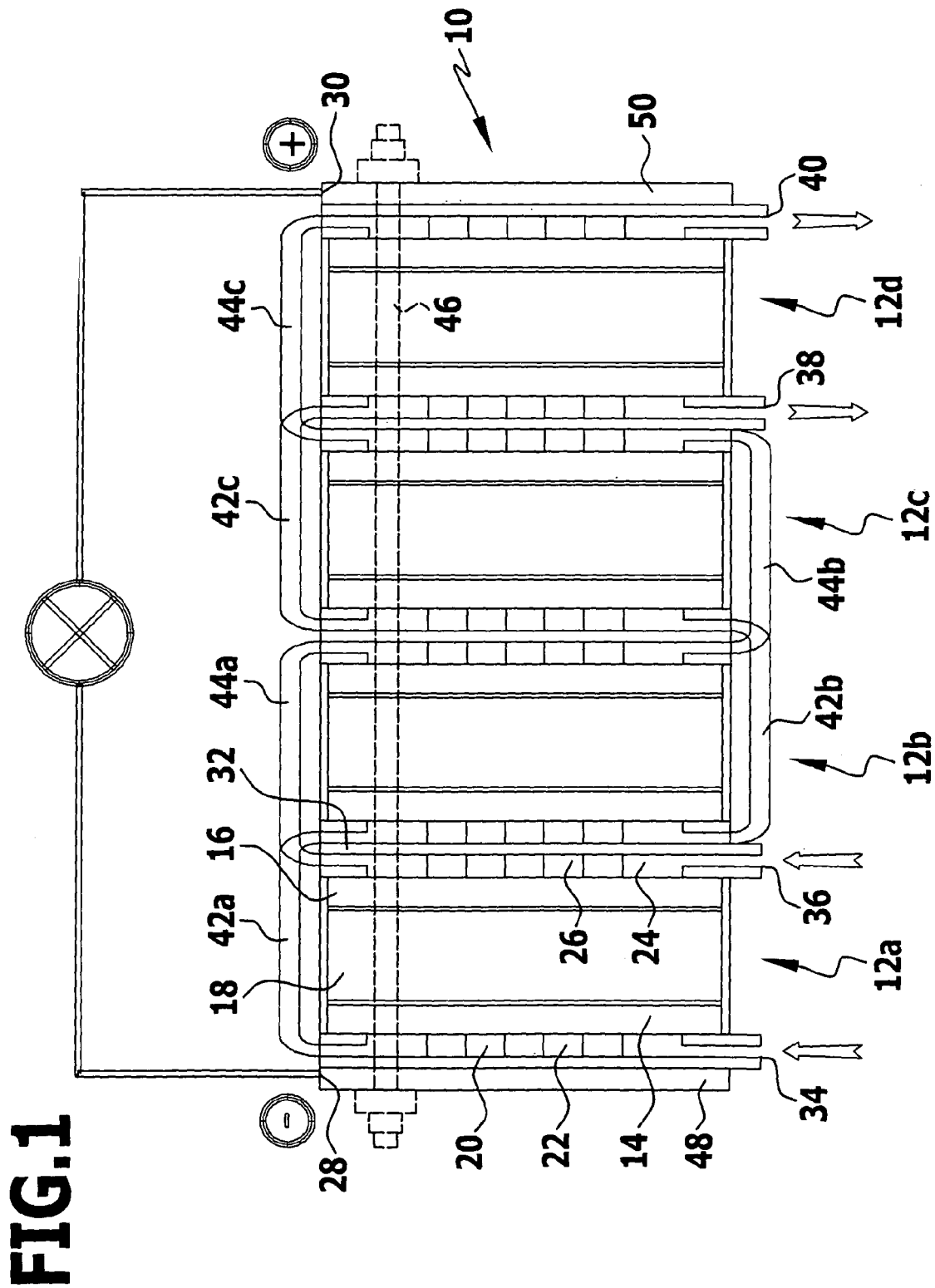
FIG. 1 shows a schematic illustration of an exemplary embodiment of a fuel cell block.

An exemplary embodiment of a fuel cell block, which is shown schematically in FIG. 1 and referenced therein by 10, comprises a multiplicity of fuel cells 12*a*, 12*b*, 12*c*, 12*d*. These fuel cells 12*a*, 12*b*, 12*c*, 12*d* are arranged in a pile. Consequently, such a fuel cell block 10 is also called a fuel cell stack or a fuel cell pile.

The individual fuel cells (for example, the fuel cell 12*a*) comprise an anode 14 and a cathode 16.

In the case of polymer membrane fuel cells (PEFC), a proton-conducting membrane 18 serving as an electrolyte is arranged between the anode 14 and the cathode 16. This membrane 18 also forms the carrier for the anode 14 and the cathode 16. It serves furthermore, as a separator for the gaseous reactants. In particular, hydrogen, which is supplied to the anode 14, is used as the fuel. Oxygen and in particular, atmospheric oxygen, which is supplied to the cathode 16, is used as an oxidizer.

In the corresponding fuel cell 12*a*, chemical energy is converted into electrical energy by the cold combustion of the fuel with the oxidizer.

For the supply of fuel to the anode 14 and for the removal of non-reacted fuel, there is provided a gas distribution structure 20 which comprises channels 22 through which the fuel is adapted to be passed and supplied to the anode 14.

In the same way, a gas distribution structure 24 which comprises channels 26 is associated with the cathode 16. Oxidizer can be supplied to the cathode 16 and non-utilised oxidizer can be removed via the gas distribution structure 24. Furthermore, water vapour can be removed.

The fuel cells 12*a*, 12*b*, 12*c*, 12*d* are connected in series. The fuel cell block 10 comprises a first electrical terminal 28 and a second electrical terminal 30 from which the fuel cell voltage in the form of the sum of the individual voltages of the fuel cells 12*a*, 12*b*, 12*c*, 12*d* can be derived.

Between respective neighbouring fuel cells 12*a*, 12*b* and 12*b*, 12*c* and 12*c*, 12*d*, there are arranged bipolar plates 32 which connect the neighbouring fuel cells electrically together (in order to implement the series connection), but which separate them in fluid-tight manner and, in particular, separate them from one another.

Provision is made, in particular, for the fuel cell block 10 to comprise a connector 34 for coupling-in the fuel and a connector 36 for coupling-in the oxidizer as well as a connector 38 for coupling-out non-reacted fuel and a connector 40 for coupling-out non-utilised oxidizer (and water). The fuel supply system and the oxidizer supply system are designed in such a way that all the fuel cells 12*a*, 12*b*, 12*c*, 12*d* can be supplied with fuel and oxidizer via the respective connectors 34, 36.

To this end in particular, the gas distribution structures 20 for the fuel for respective neighbouring fuel cells 12*a*, 12*b* and 12*b*, 12*c* and 12*c*, 12*d* are connected by lines 42*a*, 42*b*, 42*c*. Such lines can be implemented by means of channels for example.

In corresponding manner, the gas distribution structures 24 for the oxidizer are connected together by lines or channels 44*a*, 44*b*, 44*c*.

An effective fluid connection between the (input) connector 34 and the (output) connector 38 is provided by the lines 42*a*, 42*b*, 42*c*. An effective fluid connection between the (input) connector 36 and the (output) connector 40 is provided by the lines 44*a*, 44*b*, 44*c*.

The fuel cells 12*a*, 12*b*, 12*c*, 12*d* are held together in the fuel cell block 10 by means of clamping rods serving as clamping elements 46 for example. (Only one clamping element 46 is shown in FIG. 1 for illustrative reasons.) For the purposes of clamping the fuel cells 12*a*, 12*b*, 12*c*, 12*d* for example, there are provided outer framework plates 48, 50 between which the individual fuel cells 12*a*, 12*b*, 12*c*, 12*d* are clamped.

Figure 2:
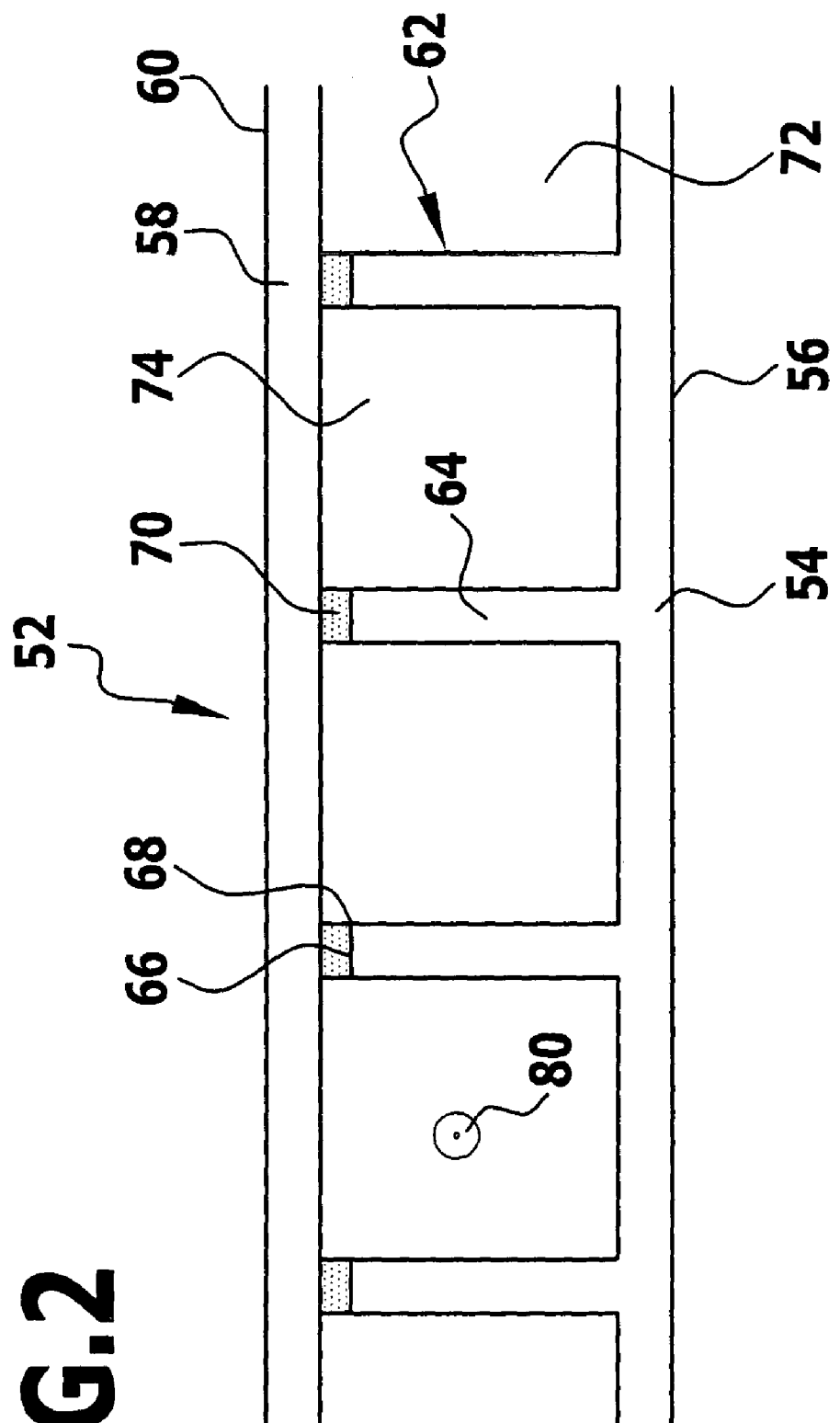
FIG. 2 a partial sectional view of a first exemplary embodiment of a bipolar plate in accordance with the invention.

A first exemplary embodiment of a bipolar plate is shown in FIG. 2 and is designated by 52 therein. This bipolar plate 52 comprises a first cover layer 54 having a substantially flat outer surface 56. This flat outer surface faces the anode 14 or the cathode 16 of a fuel cell. The gas distribution structure 20 or the gas distribution structure 24 is seated thereon.

The first cover layer 54 is produced from a metallic material such as aluminium for example.

The bipolar plate 52 comprises a second cover layer 58 having a substantially flat outer surface 60 which faces the other electrode (the cathode 16 or the anode 14). In corresponding manner, the gas distribution structure 24 or the gas distribution structure 20 is seated thereon.

The second cover layer 58 is also produced from a metallic material such as aluminium for example.

The second cover layer is connected to the first cover layer 54 by a supporting layer 62. In the exemplary embodiment shown in FIG. 2, the supporting layer 62 is connected in one piece manner to the first cover layer 54 and the second cover layer 58 is formed by a plate having substantially parallel sides.

The supporting layer 62 comprises transverse webs 64 which are spaced from one another and extend substantially perpendicularly relative to the outer surfaces 56, 60 of the first cover layer 54 and the second cover layer 58. The transverse webs 64 have an end face portion 66 which is in the form of a contact area 68 for the second cover layer 58. Hereby, the contact areas 68 of the transverse webs 64 lie substantially in a plane. The first cover layer 54 can be fixed to the supporting layer 62 by these contact areas 68 and thereby connected to the first cover layer 54 by the supporting layer 62.

For the purposes of connecting the second cover layer 58 and the second supporting layer 62, a connecting medium layer 70 is arranged on the contact areas 68. This connecting medium layer 70 is a solder layer or an adhesive layer consisting of an electrically conductive adhesive.

The first cover layer 54 is connected in electrically conductive manner to the second cover layer 58 via the supporting layer 62 with the aid of the connecting medium layer 70.

The first cover layer 54 is formed in gas-tight manner. Likewise, the second cover layer 58 is formed in gas-tight manner so that fuel and oxidizer cannot penetrate into an intermediate area 72 between the first cover layer 54 and the second cover layer 58.

Channel-like free spaces 74 are formed between neighbouring transverse webs 64. If the transverse webs 64 are perpendicular to the first cover layer 54, 58, then the free spaces 74 have a rectangular cross section.

Figure 11:
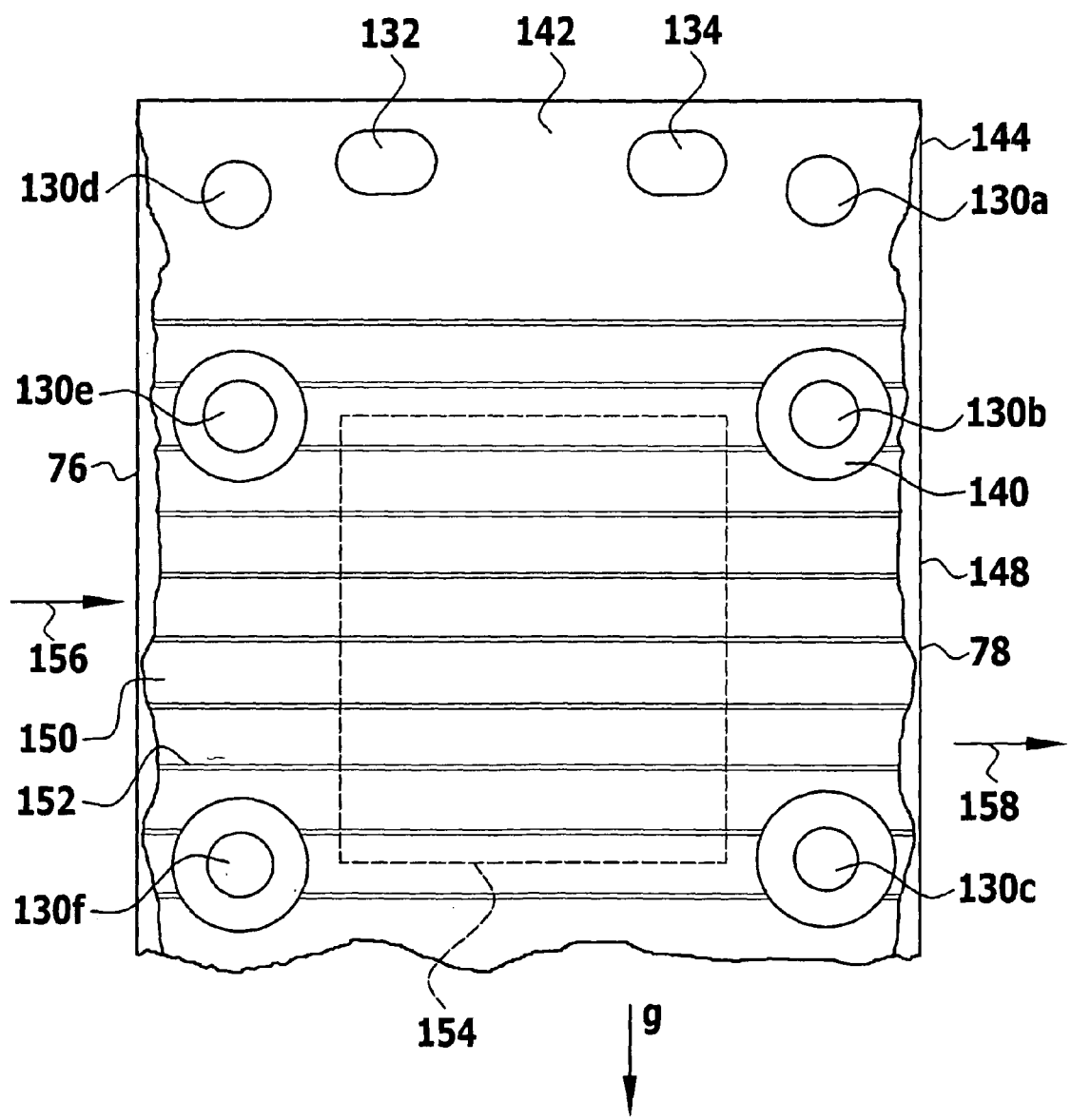
FIG. 11 an overall illustration of an exemplary embodiment of a bipolar plate in accordance with the invention.

The free spaces 74 extend through the entire width of the bipolar plate 52. The bipolar plate 52 is open at the opposite end faces 76, 78 thereof (c.f. FIG. 11) i.e. the channel-like free spaces 74 are each open at the end faces 76 and 78.

The free spaces 74 extend in a longitudinal direction 80 between the end faces 76, 78. This longitudinal direction 80 is transverse and in particular, perpendicular to the end faces 76, 78. The channel-like free spaces 74 thereby have a unitary straight-line longitudinal direction 80. The channel-like free spaces 74 are thereby "transparent" from the end face 76 to the end face 78.

The longitudinal direction 80 is parallel to the respective outer surfaces 56 and 60 of the first cover layer 54 and the second cover layer 58. Furthermore, the longitudinal directions 80 of the free spaces 74 are oriented in parallel with one another.

The free spaces 74 are in the form of coolant channels through which a fluidic coolant such as air or an electrically non-conductive liquid can be transported.

Provision can be made for the first cover layer 54 and/or the second cover layer 58 and/or the transverse webs 64 to be provided with a protective coating. For example, an anti-corrosive coating is provided. It is possible thereby for the protective coating to be formed in such a manner that the connecting medium layer 70 remains adhered thereto.

The bipolar plate 52 can, for example, be produced in that the first cover layer 54 is produced with the integrated supporting layer 62 by rolling a metal sheet such as an aluminium sheet for example. Subsequently, the second cover layer 58 is connected to the supporting layer 62 by the connecting medium layer 70. The second cover layer 58 is produced from a metal sheet for example.

The free spaces 74 which are formed from the coolant channels are separated from each other in gas-tight manner.

With the aid of the solution in accordance with the invention, a bipolar plate can be produced which is of good electrical conductivity so that neighbouring fuel cells 12a, 12b, 12c, 12d can be connected one behind the other. Furthermore, it exhibits good thermal conductivity so that the waste heat from the fuel cells is removable. Active cooling can also be achieved by virtue of the free spaces 74. Furthermore, long-term gas-tight properties can be ensured in a simple manner with a high level of mechanical stability. The supporting layer 62 supports the second cover layer 58 on the first cover layer 54 and holds these two cover layers 54, 58 apart.

The bipolar plate 52 can be produced in an economical manner in large numbers.

On the whole, a high specific electrical transmission factor with high thermal conductivity can be achieved whilst having a low temperature difference in the interior of the bipolar plate 52. The specific electrical and thermal power of a block together with a high thermal transverse conductivity can be increased especially in the case of air-cooled low-temperature polymer electrolyte membrane fuel cell blocks.

Starting materials (in particular, metal sheets) which are obtainable inexpensively and are capable of being processed in a simple and economical manner can be employed. For example, coated or uncoated thin sheets based on aluminium, magnesium or steel can be employed. Metal sheets having a prefabricated solder layer and/or a prefabricated anti-corrosive layer can be employed. Functional coatings such as anti-corrosive layers are not damaged by the manufacture process.

Furthermore, the mass of the bipolar plate 52 can be kept low due to the free spaces 74.

The volume of the free spaces 74 in the intermediate area 72 between the first cover layer 54 and the second cover layer 58 amounts to at least 70% of the total volume of the intermediate area 72, i.e. the spatial volume of the transverse webs 64 in the intermediate space 72 is less than 30% of the total volume.

Figure 3:
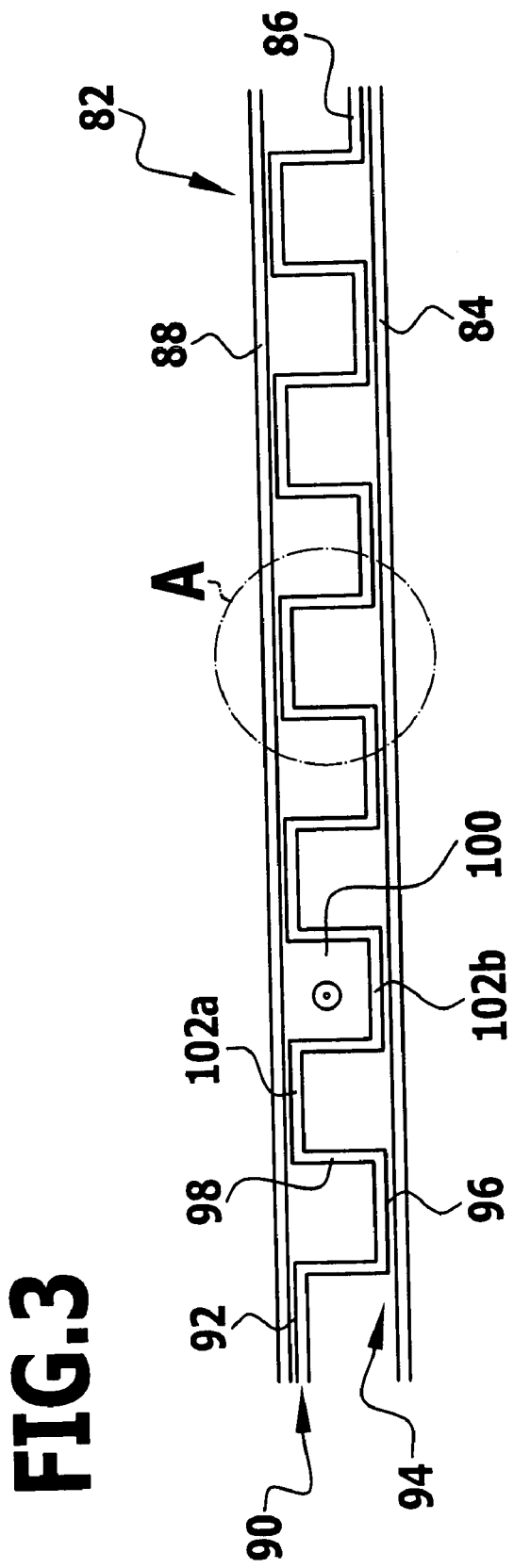
FIG. 3 a partial sectional view of a second exemplary embodiment of a bipolar plate in accordance with the invention.
Figure 4:
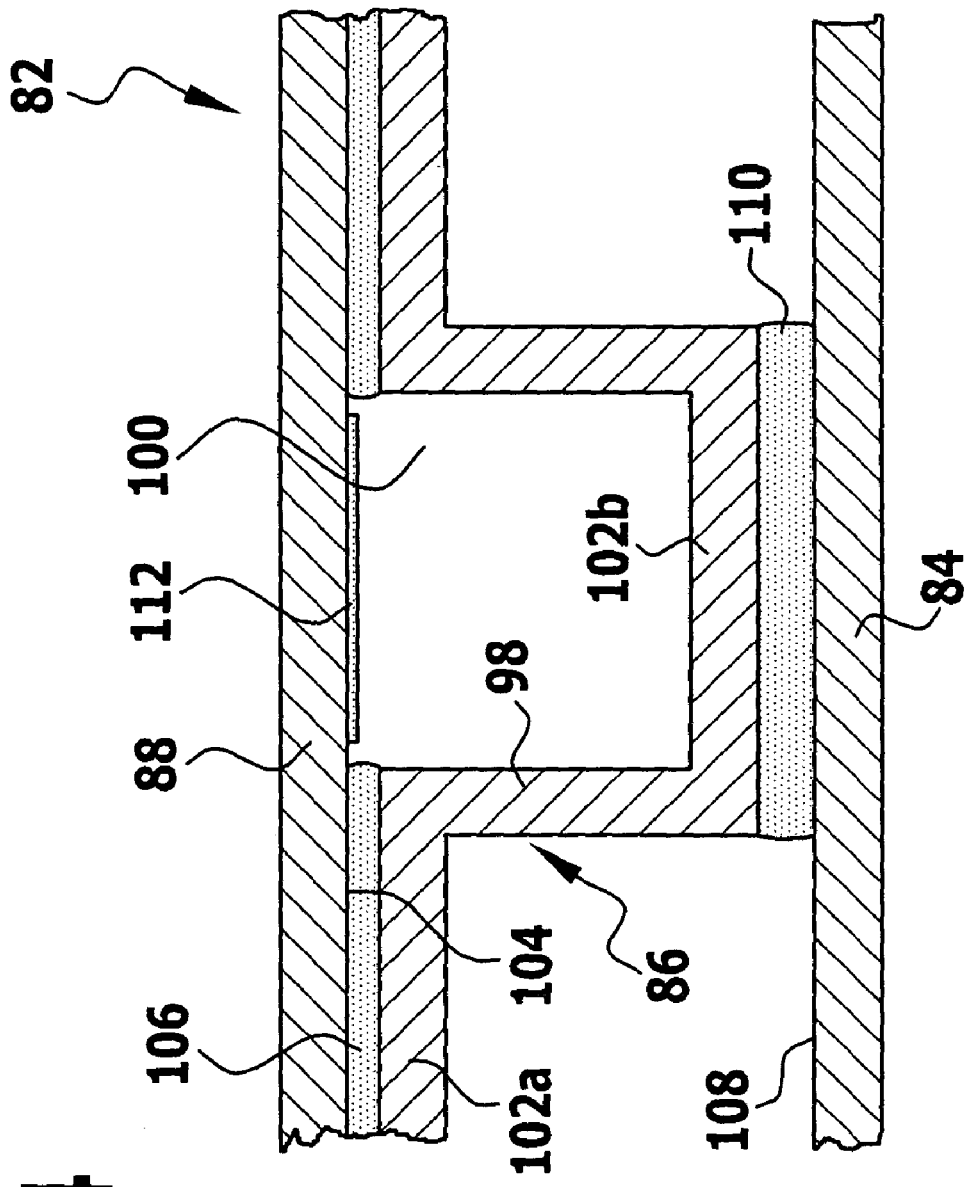
FIG. 4 an enlarged illustration of the region A in FIG. 4.

In a second exemplary embodiment of a bipolar plate which is shown in FIGS. 3 and 4 and is designated by 82 therein, there is again provided a first cover layer 84, a supporting layer 86 and a second cover layer 88. The first cover layer 84, the supporting layer 86 and the second cover layer 88 are each formed in one piece manner and are produced from a metallic material.

The supporting layer 86 is a folded structure having a first row 90 of spaced contact areas 92 for placement on the second cover layer 88 and a second row 94 of contact areas 96 for placement on the first cover layer 84. The two rows 90, 94 are mutually spaced and parallel to one another with spacing thereof in the height direction of the bipolar plate 82 between the first cover layer 84 and the second cover layer 88. The contact areas 92, 96 are mutually displaced.

The second cover layer 88 can be connected to the supporting layer 86 by means of the contact areas 92 by soldering or adhesion for example. The first cover layer 84 can be fixed to the supporting layer 86 by means of the contact areas 96 by soldering or adhesion for example.

The supporting layer 86 can be produced by folding a metal sheet.

The supporting layer 86 comprises transverse webs 98 which are oriented transversely and in particular, perpendicularly relative to the cover layers 84, 88. These transverse webs 98 hold the cover layers 84 and 88 apart. Free spaces 100 which serve, in particular, as coolant channels are formed between neighbouring transverse webs.

Neighbouring transverse webs 98 are connected together by respective parallel webs 102a (in the first row 90) and 102b (in the second row 94). These parallel webs 102a and 102b in turn form the respective contact areas 92 and 96.

A connecting medium layer 106 such as a soldering means layer for example is arranged between the parallel web 102a and an inner surface 104 of the second cover layer 88. In the same way, a connecting medium layer 110 such as a solder layer for example is arranged between a parallel web 102b and an inner surface 108 of the first cover layer 84.

The connection of the cover layers 84 and 88 to the supporting layer 86 can be effected in a furnace by a brazing or soft soldering process for example. It is possible for example, for the cover layers 84 and 88 to be coated with a thin layer of solder on only one side thereof (on their respective inner surfaces 108 and 104). Any form of protective coatings could be applied to the other surface thereof.

The supporting layer 86 does not necessarily have to be provided with a solder layer. It is sufficient to prepare it for flat-soldering to the cover layers 84, 88.

It is possible for example, for the supporting layer to comprise an anti-corrosive coating. This anti-corrosive coating is arranged in particular, on both sides. In consequence, the durability with respect to corrosion by coolants can thereby be increased. In particular, this anti-corrosive coating is adapted to be soldered.

In the case of a soldering process in an oven, it is expedient for the cover layers 84, 88 and the supporting layer 86 to be clamped or subjected to pressure in such a way that distortion due to the soldering process does not impair the dimensional stability of the bipolar plate.

Surplus solder does not even have to be removed from the bipolar plate, but can remain in the bipolar plate in the event that it is not dissolved in the coolant.

It is also possible in principle, for the supporting layer to be provided with a solder coating on both sides. A solder coating on the cover layers 84, 88 is then no longer necessary.

It is in principle also possible for both the cover layers 84, 88 and the supporting layer 86 to be solder-coated.

A protective coating 112 is indicated schematically in FIG. 4. As mentioned above, the supporting layer 86 can also be provided alternatively or additionally with a protective coating.

The supporting layer 86 formed in one piece manner is a folded structure having contact areas 92, 96 aligned in parallel. The supporting layer is periodic and can be produced by folding or bending a metal sheet for example.

Figure 5:
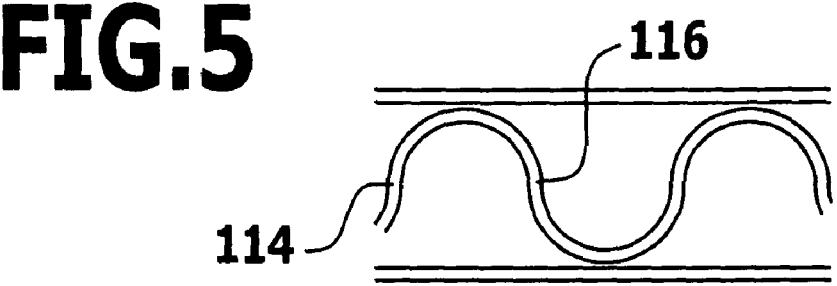
FIG. 5 a partial sectional illustration of a further exemplary embodiment of a bipolar plate in accordance with the invention.

A supporting layer 114 which comprises transverse webs 116 is shown in FIG. 5. This supporting layer 114 is formed in one piece manner and extends in a periodic wave-like manner. For example, it is sinusoidal.

Figure 6:
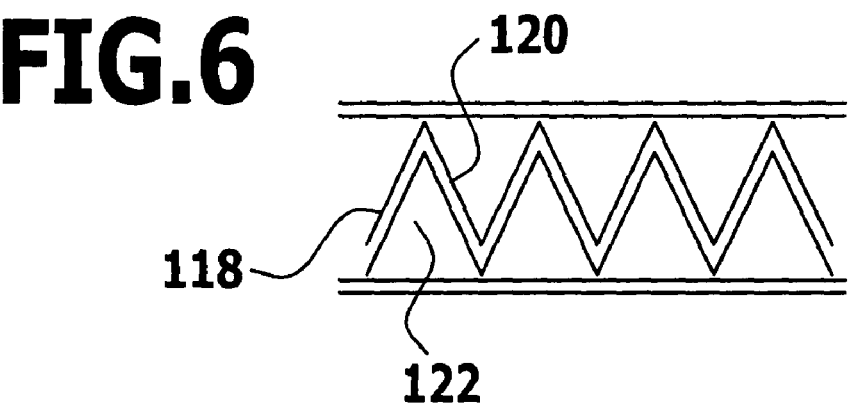
FIG. 6 a partial sectional illustration of a further exemplary embodiment of a bipolar plate in accordance with the invention.

In FIG. 6, there is shown a supporting layer 118 having transverse webs 120 wherein the free spaces 122 (and thus the channels) have a triangular cross section.

Figure 7:
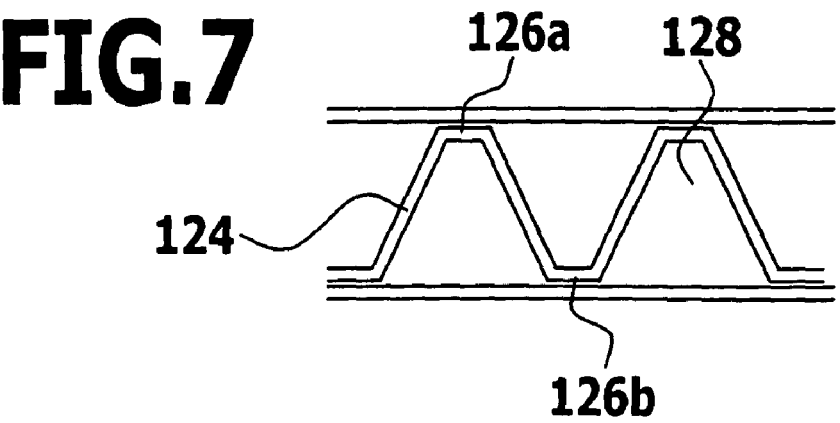
FIG. 7 a partial sectional illustration of a further exemplary embodiment of a bipolar plate in accordance with the invention.
Figure 8:
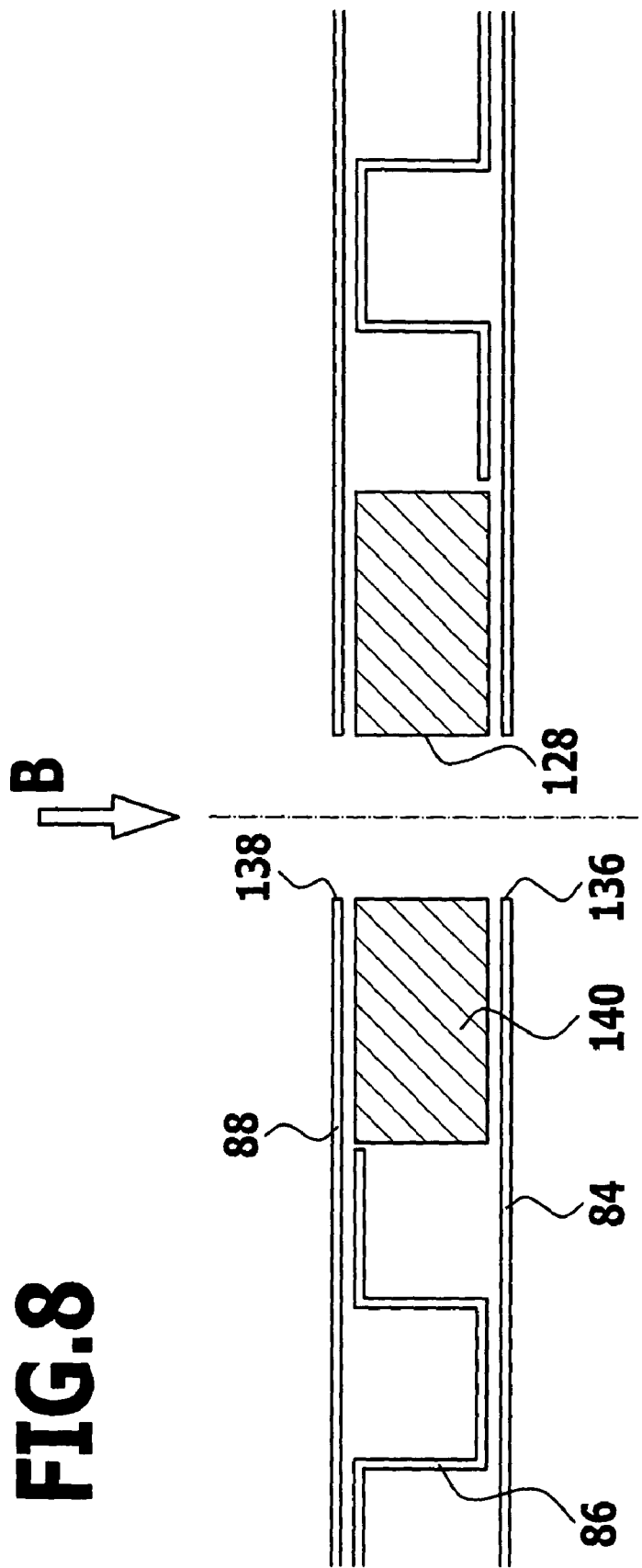
FIG. 8 a partial sectional illustration of the bipolar plate in accord with FIG. 3 in the region of a passage opening.

In FIG. 7, there is shown a supporting layer 124 which comprises transverse webs 124 and parallel webs 126a, 126b. A free space 128 has a trapezoidal cross section.

The supporting layer can be adapted in regard to its shape and in particular in regard to its geometrical outline so that the corresponding bipolar plate is optimally matched to the application thereof. For example, variables such as heat transfer and temperature difference between heat source and coolant can be adjusted by the formation of the supporting layer. An adjustment can be effected to allow for the type of coolant and for the compressive strength of the cover layers. Furthermore, adjustments can be made to the heat transfer surface. This can be achieved by selection of the material, the thickness of the material in a supporting layer, folded form or bent form and by selection of the connecting surface between the supporting layer and the cover layers.

Provision can be made for a bipolar plate, the bipolar plate 52 for example, to be provided with passage openings 128 (FIGS. 8 to 11). A passage opening which passes through the cover layers 84, 88 can thereby serve as a pass-through opening for a clamping element 46. Such passage openings are designated by the reference symbols 130a, 130b, 130c, 130d, 130e, 130f in FIG. 11.

Passage openings can also be provided in order to form a gas channel. Such passage openings are designated by the reference symbols 132, 134 in FIG. 11. They serve to accommodate lines 42a, 42b, 42c or 44a, 44b, 44c such as were described above on the basis of the fuel cell block 10, or could themselves form line portions.

A passage opening 128 is formed by respective openings 136 in the first cover layer 84 and an opening 138 in the second cover layer 88, whereby these openings 136, 138 are connected together in a material-free manner by a free space which passes through the supporting layer 86.

An insert element 140 is arranged in the region of the passage opening 128, said insert element being produced, in particular, from a solid material and its height being such as to correspond to the height between the first cover layer 84 and the second cover layer 88. The insert element 140 itself comprises a passage opening which provides the connection between the openings 136 and 138.

Point forces can be introduced into the bipolar plate over an area via the insert element.

Such an insert element 140 is produced in the form of a thick-walled pipe of matching diameter for example. The height of this pipe corresponds to the distance between the cover layers 84 and 88. A corresponding free space is produced in the supporting layer 86, by stamping for example, at the point at which an insert element 140 is to be inserted.

The insert element 140 is connected to the cover layers 84 and 88 in the same way as they are connected to the supporting layer 86. For example, there is provided a connecting medium layer in the form of a solder layer which is seated on opposite sides of the insert element 140.

Figure 9:
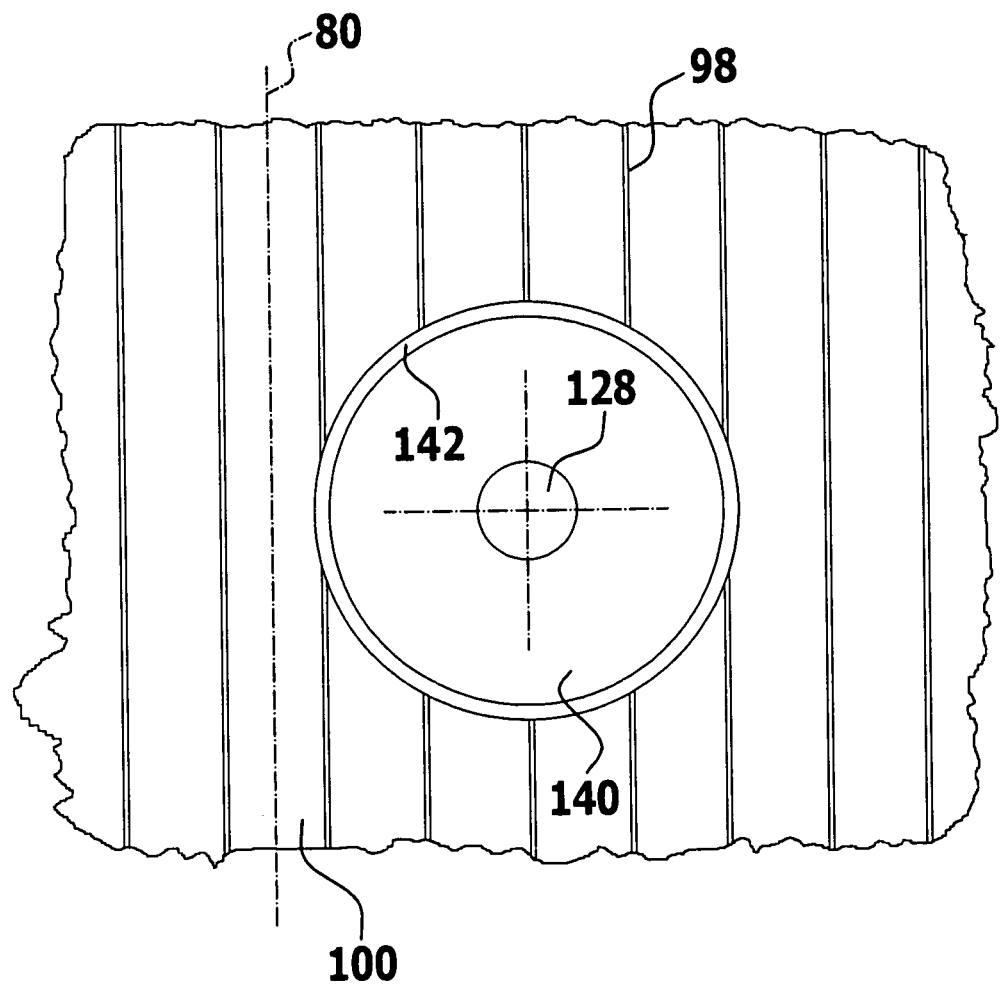
FIG. 9 a plan view of the bipolar plate in accord with FIG. 7 in the direction B.

Basically, the stream of coolant through the corresponding coolant channel 100 (free space) can be disrupted by an insert element 140. Provision is made for the transverse webs 98 in the proximity of the insert element 140 to be formed in such a manner that it is possible for the stream to pass by the insert element 140. For example, transverse webs 98 in this area are "pressed flat". This is indicated in FIG. 9 by the region bearing the reference symbol 142.

Figure 10:
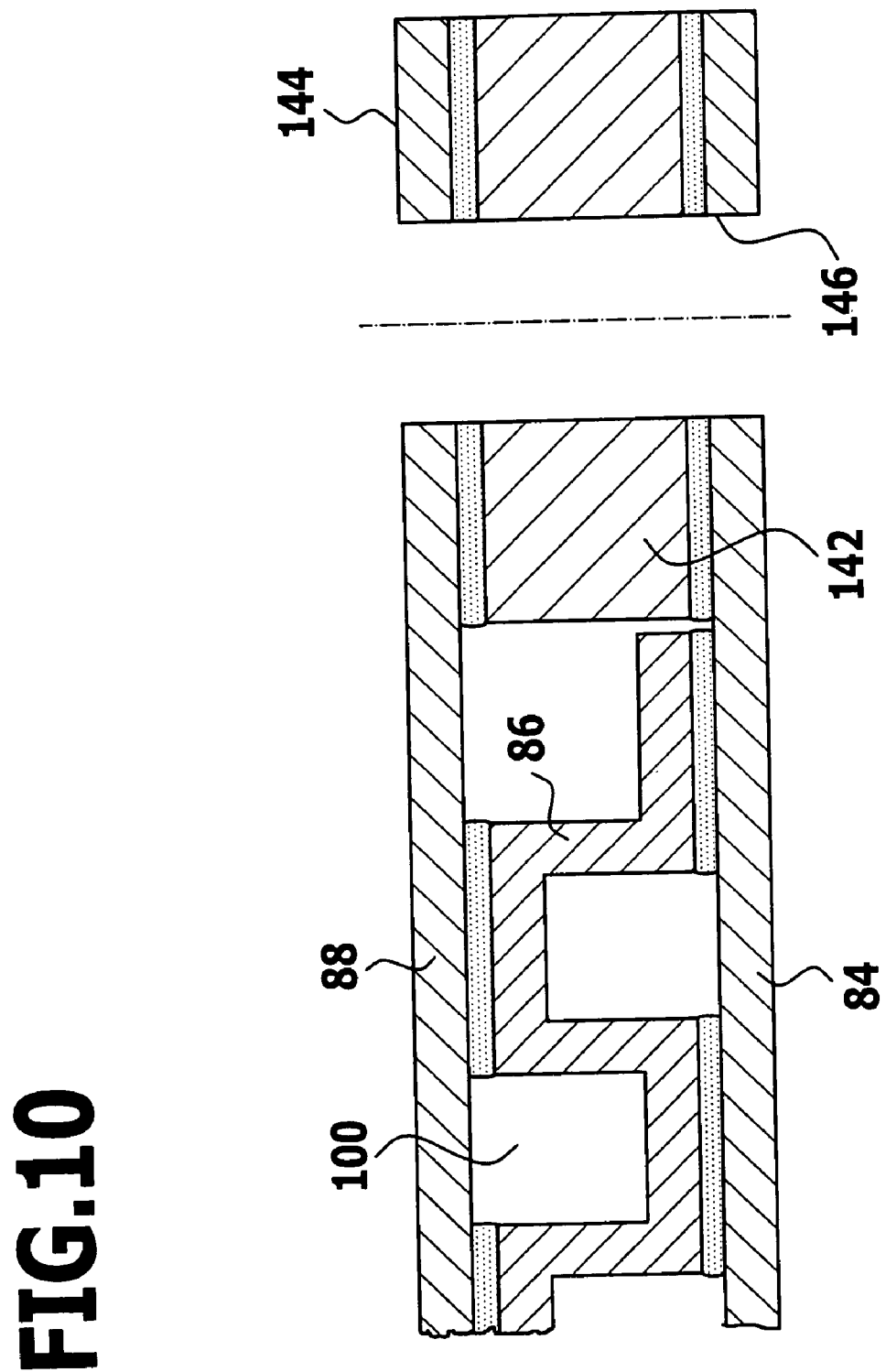
FIG. 10 a partial sectional illustration of the bipolar plate in accord with FIG. 3 in the region of an outer end.

It is also possible, as is indicated in FIG. 10, for an insert element 142 to be arranged at an end portion 144 of the bipolar plate and for a passage opening 146 to be formed by means of this insert element 142. This passage opening 146 can serve as a pass-through opening for a clamping element 46 or as a gas channel.

If the passage opening 146 serves as a gas channel, then care must be taken to provide a good seal with respect to the free spaces 100 (coolant channels 100). The passage opening 146 can serve directly as a channel boring or a line can be laid therein.

The insert element 142 can be assigned a seal or the corresponding cover layers 84, 88 can be provided with a seal in the region of the insert element.

In FIG. 11, there is shown an example of a bipolar plate 148 incorporating passage openings 130a to 130f and also 132, 134 of the type described above. The free spaces in the form of coolant channels 150 run between the end faces 76 and 78, whereby neighbouring coolant channels are separated from each other in fluid-tight manner by means of transverse webs 152.

An active electrode surface denoted by the reference symbol 154 is shown in FIG. 11. This surface area is occupied by the anode or the cathode to which the bipolar plate 148 is connected. The passage openings 130b, 130c, 130e, 130f lie outside this active electrode surface 154.

The passage openings 130a, 130d as well as 132 and 134 are located in an end portion 144 in a plate-like insert element 142 for example.

The passage openings 130b, 130c, 130e, 130f are surrounded by an insert element 140 as described above.

A gas distribution structure can be arranged or formed on the bipolar plate 148 in order to enable fuel or oxidizer to be supplied to the corresponding electrode, or, to enable non-utilised fuel or oxidizer to be removed. For example, the gas distribution structure is formed by a metal sponge which is pressed onto the corresponding electrode by the bipolar plate. Due to this pressing action which is produced by clamping elements 46, the gas distribution structure can be formed into an appropriate shape.

It is in principle also possible for a bipolar plate in accordance with the invention to be placed between the bipolar plates of fuel cells as a cooling element.

Provision can be made, as is schematically shown in FIG. 11 for example, for the coolant channels 150 to be aligned horizontally i.e. to be oriented perpendicularly to the direction of the force of gravity.

In particular, air serving as a coolant can be coupled-into the coolant channels 150. This coupling process is indicated by the arrow bearing the reference symbol 156. The (heated) cooling air can be coupled-out at the opposite end face 78. This is indicated by the arrow bearing the reference symbol 158. In the case of horizontal alignment of the coolant channels 150, the cooling air flows through the bipolar plate 148 horizontally. The entry of coolant into the coolant channels 150 is effected, in particular, at that side of the bipolar plate 148 (in FIG. 11, at the end face 76) at which an outlet for the hottest medium is located. Usually, this is the oxidizer outlet from which the residual air, which is oxygen-impoverished and contains water vapour, emerges. Usually, fuel and oxidizer also flow through a fuel cell in a substantially vertical direction from top to bottom. (The flow through the fuel cells 12a and 12c in FIG. 1 is from bottom to top.)

Figure 12:
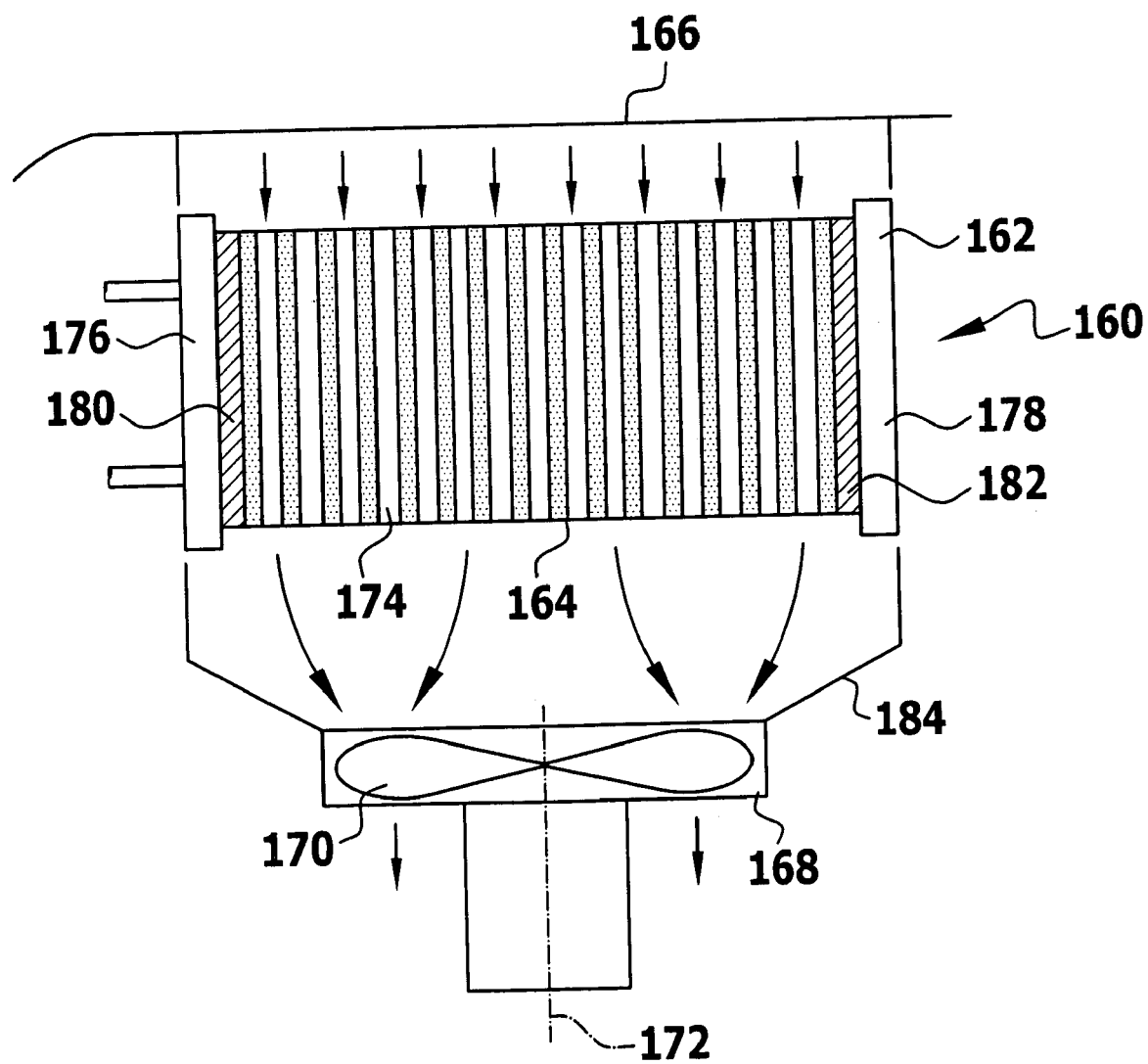
FIG. 12 an exemplary embodiment of a fuel cell block arrangement in accordance with the invention.

In accordance with the invention, a fuel cell block arrangement 160 (FIG. 12) is made available which comprises a fuel cell block 162 having one or more bipolar plates 164 in accordance with the invention between neighbouring fuel cells.

The fuel cell block 162 is arranged between a radiator grille 166 and a fan 168. The radiator grille 166 comprises openings through which cooling air is adapted to be sucked.

The fan 168 comprises a rotor 170 which is rotatable about a rotor axis 172.

The at least one bipolar plate 164 is arranged between the radiator grille 166 and the fan 168, namely, in such a manner that the cooling air sucked in by the fan 168 flows through the coolant channels 174 of the bipolar plate 164.

Hereby, the longitudinal axes of the coolant channels 174 are aligned substantially parallel to the rotor axis 172 of the fan 168.

Cooling air sucked in by the fan thus contributes to the cooling of the fuel cell block 160 by flowing through the bipolar plate 164. In consequence, the electro-chemical electrodes of the fuel cell block 162 can be cooled.

The fuel cell block 162 comprises opposite end plates 176, 178 between which the fuel cells of the fuel block 162 are clamped by means of clamping rods for example. Insulating plates 180, 182 can be provided between the end plates 176, 178 and the neighbouring fuel cells.

A cover member 184 which serves for guiding the air can be provided between the fuel cell block 162 and the fan 168. It can thus be ensured, in particular, that cooling air is drawn through the at least one bipolar plate 164.

In the case of the solution in accordance with the invention, direct cooling of the electrode surfaces of a fuel cell 12a, 12b, 12c, 12d can be achieved directly at the point where waste heat occurs by means of the bipolar plate in accordance with the invention incorporating a continuous hollow interior (via the free spaces). The working current density can be increased in a simple manner due to this direct cooling of the active surface of the fuel cell. In particular, the working current density can be increased by a factor of 2 to 3 in comparison with indirect cooling processes.

The invention claimed is:

1. A bipolar plate for electro-chemical applications, comprising:
   a first cover layer of a metallic material;
   a second cover layer of a metallic material;
   a supporting layer of a metallic material which is arranged between the first cover layer and the second cover layer and is connected to the first cover layer and the second cover layer;
   the supporting layer comprising at least one row of contact areas for at least one of the first cover layer and the second cover layer, with free spaces being formed between neighbouring contact areas;
   at least one passage opening passing through the first cover layer and at least one passage opening passing through the second cover layer and serving as a pass-through for a clamping element, respectively;
   an insert element by means of which point forces are introducible over an area, said insert element being arranged between the first cover layer and the second cover layer in a region of the at least one passage openings of the first cover layer and the second cover layer, respectively; and
   wherein the insert element comprises an insert element passage opening providing a connection between the at least one passage opening of the first cover layer and the at least one passage opening of the second cover layer.

2. A bipolar plate in accordance with claim 1, wherein the free spaces extend between the first cover layer and the second cover layer and/or extend between a cover layer and a contact area of the supporting structure on the other cover layer.

3. A bipolar plate in accordance with claim 1, wherein the free spaces are aligned substantially in parallel with one another.

4. A bipolar plate in accordance with claim 1, wherein the free spaces extend between a first end face of the bipolar plate and an oppositely located second end face of the bipolar plate.

5. A bipolar plate in accordance with claim 4, wherein the free spaces are open at the end faces.

6. A bipolar plate in accordance with claim 1, wherein the free spaces each have a longitudinal axis which is substantially a straight-line.

7. A bipolar plate in accordance with claim 1, wherein the free spaces each have a longitudinal axis which is substantially parallel to the first cover layer.

8. A bipolar plate in accordance with claim 1, wherein the free spaces each have a longitudinal axis which is substantially parallel to the second cover layer.

9. A bipolar plate in accordance with claim 1, wherein the free spaces each have a longitudinal axis which is transverse to an end face of the bipolar plate.

10. A bipolar plate in accordance with claim 9, wherein each respective longitudinal axis is substantially perpendicularly to the end face.

11. A bipolar plate in accordance with claim 1, wherein at least 70% of spatial volume between the first cover layer and the second cover layer is occupied by free spaces.

12. A bipolar plate in accordance with claim 1, wherein neighbouring free spaces are separated from each other in fluid-tight manner.

13. A bipolar plate in accordance with claim 1, wherein the supporting layer comprises webs which are oriented transversely relative to the first cover layer and transversely relative to the second cover layer.

14. A bipolar plate in accordance with claim 1, wherein the free spaces are each of substantially the same cross section.

15. A bipolar plate in accordance with claim 1, wherein the supporting layer has a periodic structure.

16. A bipolar plate in accordance with claim 1, wherein the free spaces are formed as coolant channels.

17. A bipolar plate in accordance with claim 1, wherein the contact areas of the at least one row of contact areas lie substantially in a plane.

18. A bipolar plate in accordance with claim 1, wherein a connecting medium layer is arranged between the contact areas of the supporting layer and at least one of the first cover layer and the second cover layer.

19. A bipolar plate in accordance with claim 18, wherein the connecting medium layer is a solder layer or an adhesive layer consisting of an electrically conductive adhesive.

20. A bipolar plate in accordance with claim 1, wherein the first cover layer and/or the second cover layer are formed in one piece.

21. A bipolar plate in accordance with claim 1, wherein the supporting layer is formed in one piece.

22. A bipolar plate in accordance with claim 1, wherein the supporting layer is connected in one piece manner to either the first cover layer or the second cover layer.

23. A bipolar plate in accordance with claim 22, wherein the first cover layer and the supporting layer are produced from a rolled metal sheet.

24. A bipolar plate in accordance with claim 1, wherein the first supporting layer is a folded structure or a wave-like structure.

25. A bipolar plate in accordance with claim 1, wherein the first cover layer and the second cover layer are formed such as to be gas-tight.

26. A bipolar plate in accordance with claim 1, wherein a protective coating is arranged on at least one of the first cover layer, the second cover layer, and the supporting layer.

27. A bipolar plate in accordance with claim 1, wherein the insert element is a solid material element.

28. A bipolar plate in accordance with claim 1, wherein the insert element is connected to at least one of the first cover layer and the second cover layer.

29. A bipolar plate in accordance with claim 1, wherein the supporting layer is formed in proximity to the insert element in such a way as to enable fluid flowing in the free spaces to flow past the insert element.

30. A bipolar plate in accordance with claim 1, wherein the at least one passage opening is sealed with respect to the free spaces.

31. A bipolar plate in accordance with claim 1, wherein:
a first gas distribution structure is seated on the first cover layer; and
a second gas distribution structure is seated on the second cover layer.

32. A fuel cell block arrangement, comprising:
a fuel cell block, said fuel cell block comprising:
a first fuel cell;
a second fuel cell; and
at least one bipolar plate is arranged between at least the first fuel cell and the second fuel cell, each of said at least one bipolar plate comprising:
a first cover layer of a metallic material;
a second cover layer of a metallic material;
a supporting layer of a metallic material which is arranged between the first cover layer and the second cover layer and is connected to the first cover layer and the second cover layer;
the supporting layer comprising at least one row of contact areas for at least one of the first cover layer and the second cover layer, with free spaces being formed between neighbouring contact areas;
at least one passage opening passing through the first cover layer and at least one passage opening passing through the second cover layer and serving as a pass-through for a clamping element, respectively;
an insert element by means of which point forces are introducible over an area, said insert element being arranged between the first cover layer and the second cover layer in a region of the at least one passage openings of the first cover layer and the second cover layer, respectively; and
wherein the insert element comprises an insert element passage opening providing a connection between the at least one passage opening of the first cover layer and the at least one passage opening of the second cover layer.

33. A fuel cell block arrangement in accordance with claim 32, wherein:
coolant channels are formed in the free spaces of the at least one bipolar plate; and
the at least one bipolar plate is arranged in such a way that the coolant channels lie substantially horizontally.

34. A fuel cell block arrangement in accordance with claim 32, wherein the fuel cells are arranged and formed in such a way that fuel and oxidizer can flow through the fuel cells in a substantially vertical direction.

35. A fuel cell block arrangement in accordance with claim 33, wherein a coolant inlet into the coolant channels of the at least one bipolar plate is located at a side of the at least one bipolar plate at which a hottest medium emerges.

36. A fuel cell block arrangement in accordance with claim 35, wherein an outlet for the hottest medium is an air outlet.

37. A fuel cell block arrangement in accordance with claim 32, wherein an open end face of the at least one bipolar plate faces a radiator grille.

38. A fuel cell block arrangement in accordance with claim 32, wherein an open end face of the at least one bipolar plate faces a fan.

39. A fuel cell block arrangement in accordance with claim 32, wherein the at least one bipolar plate is arranged between a radiator grille and a fan.

40. A fuel cell block arrangement in accordance with claim 39, wherein a cover member is arranged between the fuel cell block and the fan for guiding cooling air.

* * * * *